3,226,375
METHOD OF EMULSION POLYMERIZATION
Gerald G. Greth, Wilmington, and Joseph E. Wilson, Newark, Del., assignors to Atlas Chemical Industries, Inc., Wilmington, Del., a corporation of Delaware
No Drawing. Filed July 11, 1961, Ser. No. 123,108
9 Claims. (Cl. 260—89.1)

This invention relates to an improved method of emulsion polymerization and to blended emulsifier compositions which are used in the emulsion polymerization process. In particular, this invention relates to an anionic/non-ionic emulsifier blend which is incorporated in an aqueous medium in which emulsion polymerization of vinyl monomers is to be carried out.

In the emulsion polymerization art, little attention has been devoted to developing especially effective emulsifiers. At the present time, the polymer chemist selects an emulsifier by a trial and error technique. In emulsion polymerization systems the emulsifier performs the following functions:

(1) Produces a stable and well dispersed emulsion of the vinyl monomer in water.
(2) Forms micelles which solubilize the vinyl monomer and in which the polymerization occurs.
(3) Stabilizes the polymer particles as they are formed, and thereby prevents precipitation, coagulation and sedimentation of the polymer.

It is apparent that the emulsifier exerts a great influence on emulsion polymerization processes and on the resultant polymeric products. Therefore, the emulsifier should be selected with discrimination.

Some of the properties of the emulsion polymerization medium which should be considered in selecting an emulsifier are as follows:

*Emulsion stability.*—The emulsion should remain stable at room temperature for several months.

*Particle size.*—The desired particle size, i.e., size of the emulsifier micelles and subsequent polymer particle size, depends on the end use and must be varied accordingly.

*Emulsion viscosity.*—The desired viscosity may cover a wide range and also depends on the end use of the polymer. In general, free flowing emulsions are prepared.

*Conversion rate.*—In order for the emulsion polymerization process to be economically feasible, the rate of conversion of monomer to polymer should be such that the polymerization is substantially complete in a short time.

Since emulsion polymerizations are carried out in aqueous media, the properties of the water also affect the emulsion stability, rate of conversion and properties of the final product. At the present time, it is generally considered that hard water cannot be used because of the inability to form a stable emulsion and the poor conversion rates which are achieved. Therefore, it is necessary to deionize the water prior to using it in emulsion polymerizations, and deionization is a costly process.

Another problem which plagues the emulsion polymerization art is the contamination of the polymer product by minute amounts of metallic salts which promote discoloration of the polymer. This problem is particularly prevalent in the polymerization of vinyl chloride. Because of this metallic salt contamination problem, most types of anionic emulsifiers, which are metal salts, are not used to carry out emulsion polymerizations.

It is an object of this invention to provide an emulsifier blend for use in emulsion polymerization reactions which can be used to control particle size.

Another object is to provide an emulsifier blend which produces very good polymerization emulsion stability.

Still another object is to provide an emulsifier blend which yields good conversion rates in the emulsion polymerization of vinyl monomers.

An additional object is to provide an anionic emulsifier as a component of an anionic/nonionic emulsifier blend which is not a metal salt and thereby avoids the problem of metallic salt contamination.

A further object of the invention is to provide an emulsifier blend which can be used in hard water to form stable polymerization emulsions and which yields good conversion rates.

A still further object is to provide an emulsifier blend which eliminates the necessity of using a protective colloid in the emulsion polymerization of vinyl acetate.

Other objects and purposes of this invention will be apparent to those skilled in the art in view of the description which follows.

It has been discovered that emulsifier blends of a lower alkylamine salt of alkyl aryl sulfonic acids, a non metal salt anionic emulsifier, blended with polyoxyethylene compounds which are nonionic emulsifiers, are especially effective for carrying out the emulsion polymerization of vinyl monomers. Emulsion polymerization media which contain these anionic/nonionic emulsifier blends have excellent stability, very small particle size, high conversion rates and can be prepared from hard water.

It has been found that particle size, conversion rates and emulsion viscosity can be controlled to a considerable extent by careful selection of emulsifier HLB (hydrophile-lipophile balance). A detailed description of the classification of emulsifiers and emulsifier blends by their hydrophile-lipophile balance appears in an article by William C. Griffin in the Journal of the Society of Cosmetic Chemists, vol. I, No. 5, p. 311, December 1949. In the HLB system, an emulsifier that is hydrophilic in character is assigned a high number and lipophilic emulsifiers are assigned low numbers. HLB values may range from one to forty, with the best emulsions generally formed by using emulsifiers or emulsifier blends having an HLB of about 10. When two or more emulsifiers are combined or blended, the HLB values are additive in behavior, and therefore, it is relatively easy to vary the HLB of the emulsifier and thereby vary the emulsion properties.

In accordance with this invention, it has been found that vinyl monomer emulsion polymerizations are best carried out using emulsifier blends having an HLB ranging from about 7 to about 20. Accordingly, the ratio of lower alkalamine salts of alkyl aryl sulfonic acids to polyoxyethylene compounds is varied in order to give the desired emulsion properties. An extensive study has revealed that emulsion polymerizations of styrene are best carried out using an emulsifier blend having an HLB range of about 13.5 to about 16, whereas when vinyl acetate is being polymerized, an HLB range of about 14.5 to about 17.5 is preferred.

An additional feature of this invention is that a lower alkylamine salt of alkyl aryl sulfonic acids/polyoxyethylene compound blend may be used to carry out emulsion polymerizations in hard water. This is desirable for it eliminates the costly water deionization procedure. Also, it has been found that the anionic/nonionic emulsifier blends of this invention may be used in the emulsion polymerization of vinyl acetate without employing a protective colloid which is generally regarded as essential in forming a fine particled, stable emulsion.

The anionic emulsifiers used to prepare the emulsifier blends of this invention are lower alkylamine salts of alkyl aryl sulfonic acids. In general, the anionic emulsifiers are prepared from alkyl aryl sulfonic acids having from about 13 to about 25 carbon atoms per molecule. These sulfonic acids are preferred because of their surface activity and their availability, for they are widely used to prepare surfactants. Representative of the alkyl aryl sulfonic acids which may be used are dodecyl benzene sulfonic acid, butyl naphthalene sulfonic acid, n-octyl naphthalene sulfonic acid, nonyl benzene sulfonic acid, hexyl diphenyl sulfonic acid and propyl diphenyl sulfonic acid. In particular, dodecyl benzene sulfonic acid is preferred for it is readily available, and its lower alkylamine salts when blended with polyoxyethylene oleyl alcohol form very good polymerization emulsions. Examples of the other alkyl aryl sulfonic acids whose lower alkylamine salts may be used as anionic emulsifiers in this invention may be found in the text Surface Active Agents, by Anthony M. Schwartz and James W. Perry, pp. 111–140, Interscience Publishers, Inc., New York, N.Y. (1949).

Typical of the lower alkylamine salts of the alkyl aryl sulfonic acids which may be used as anionic emulsifiers in accordance with this invention are methylamine salts, ethylamine salts, isopropylamine salts, butylamine salts, hexylamine salts, etc. The isopropylamine salts are particularly effective.

The polyoxyethylene compounds which are used as the nonionic component of the emulsifier blends of this invention are any of the conventional ethylene oxide derivatives which are commonly used as nonionic emulsifiers. Representative of such compounds are the polyalkylene glycol esters of long chain fatty acids, alkyl polyglycol ethers, polyoxyethylene octyl and nonyl phennols and other ethylene oxide derivatives. Polyoxyethylene derivatives of oleyl alcohol are particularly preferred.

The amount of ethylene oxide present in the polyoxyethylene nonionic emulsifier can vary, depending upon the amount necessary to impart the desired HLB value to the emulsifier blend. It is well known that the HLB value of polyoxyethylene compounds increases as the ethylene oxide content increases. In general, nonionic emulsifiers containing from about 5 to about 50 ethylene oxide groups per molecule may be used in the emulsifier blends to yield the desired HLB value.

As previously stated, polyoxyethylene oleyl alcohol has proven to be a very effective nonionic emulsifier. A particularly effective blend is isopropylamine dodecyl benzene sulfonate/polyoxyethylene (20) oleyl alcohol (the number in parentheses represents the moles of ethylene oxide per mole of oleyl alcohol).

In carrying out emulsion polymerizations in accordance with this invention, the anionic emulsifier and nonionic emulsifier may be added separately to the aqueous reaction medium, though it is generally preferred to blend the emulsifiers prior to incorporating them into the reaction medium. In most instances, blending the emulsifiers prior to adding them to the reaction medium results in an improved and more stable emulsion. Though it is not critical and is a matter of operator's choice, the reaction medium generally contains from about 0.5 to about 5 weight percent of emulsifier.

The examples which follow are illustrative of the improved method of emulsion polymerization and the emulsifier compositions of this invention.

EXAMPLE I

The following formulation was used to carry out the emulsion polymerization of styrene:

| Ingredient: | Amount (grams) |
|---|---|
| Styrene | 200 |
| Distilled water | 300 |
| Potassium persulfate | 0.75 |
| Sodium bisulfite | 0.30 |
| Emulsifier | 20 |

Each polymerization run was made in a four-necked, one liter flask fitted with a reflux condenser, variable speed stirrer, nitrogen inlet and outlet, thermometer and dropping funnel. The reaction flask was immersed in a constant temperature bath adjusted to 50° C. The styrene was the "monomer grade" of Shell Chemical Co. and contained 10 to 15 p.p.m. of t-butyl catechol as a polymerization inhibitor. In order to get consistent results, the polymerization inhibitor was removed by extraction with 5% aqueous sodium hydroxide.

In these polymerization runs, the amount of emulsifier used was held constant at 3.84 weight percent, but the ratio of anionic to nonionic was varied to give HLB values ranging from 11.7 to 15.3. The anionic emulsifier was isopropyl amine dodecyl benzene sulfonate, and the nonionic emulsifier was polyoxyethylene (20) oleyl alcohol.

In carrying out a polymerization run, the emulsifier and persulfate catalyst plus bisulfite catalyst activator were dissolved in distilled water. While the solution was stirred, the nitrogen was turned on to purge the system of any oxygen. After the contents of the flask reached 50° C., the styrene was added at a moderate rate (200 g. in 15 min.). Samples were removed from the flask at half hour intervals, and the conversion of styrene to polystyrene was determined by measuring the percent solids present. After plotting conversion versus time the rate of conversion was determined from the slope of the straight line portion of the curve. Virtually no polymerization occurred in the first 15 minutes following the addition of styrene. Thereafter, the polymerization proceeded at a rapid rate until about 80 to 90% conversion, and then the rate slowed down as the remainder of the styrene was polymerized. After polymerization was complete, the emulsion was allowed to cool to 35° C. while stirring, and then it was filtered.

In addition, emulsion stability was determined by observation, the emulsion viscosity was measured, and the emulsion particle size was determined from turbidity measurements on diluted emulsions of known concentration. The method for determining particle size was an adaptation of a method developed by F. W. Billmeyer, Journal of the American Chemical Society, vol. 76, p. 4636 (1954). This method was standardized by light scattering determination of particle size on a few of the emulsions.

The results of these polymerizations are reported in the following table:

Table I

| Anionic/nonionic ratio | HLB | Total percent conversion | Conversion rate (percent/hr.) | Emulsion stability | Emulsion viscosity (cps.) | Particle size (microns) |
|---|---|---|---|---|---|---|
| 100/0 | 11.7 | 41.8 | 7.0 | Excessive preflocculation formation. | 7 | 0.09 |
| 70/30 | 12.8 | 96.9 | 59.0 | Stable for more than one week. | 172 | 0.06 |
| 50/50 | 13.5 | 98.8 | 62.0 | ----do---- | 375 | 0.06 |
| 30/70 | 14.2 | 97.4 | 58.0 | ----do---- | 174 | 0.06 |
| 0/100 | 15.3 | 95.7 | 59.6 | ----do---- | 18 | 0.09 |

These results indicate that the anionic/nonionic emulsifier blends produced stable emulsions, very small particle size and yielded high total conversions at a fast conversion rate. It was determined that an emulsifier blend having an HLB value of 13.5 gave the best results.

EXAMPLE II

In this series of styrene emulsion polymerization tests, the procedure of Example I was used, though the amount of emulsifier blend used was varied while the anionic/nonionic ratio (50/50) yielding an HLB of 13.5 was held constant. Isopropylamine dodecyl benzene sulfonate and polyoxyethylene (20) oleyl alcohol were again used as the emulsifiers. The results are presented in Table II.

Table II

| Percent emulsifier | Total percent conversion | Conversion rate (percent/hr.) | Emulsion stability | Emulsion viscosity (cps.) | Particle size (microns) |
|---|---|---|---|---|---|
| 1.95 | 94.9 | 60.0 | Stable for more than one week. | 125 | 0.08 |
| 2.41 | 93.4 | 89.0 | -----do--------------- | 30 | 0.08 |
| 2.89 | 94.4 | 89.2 | -----do--------------- | 43 | 0.07 |
| 3.45 | 96.1 | 88.7 | -----do--------------- | 125 | 0.07 |
| 3.84 | 98.8 | 92.0 | -----do--------------- | 225 | 0.06 |
| 4.30 | 98.0 | 88.1 | -----do--------------- | 832 | 0.06 |
| 4.75 | 100 | 91.9 | -----do--------------- | 7,000 | 0.05 |

These results indicate that the emulsifier blends of this invention are effective at various levels, and that as the amount of emulsifier increases, the total conversion and emulsion viscosity increase while the particle size decreases.

EXAMPLE III

The anionic/nonionic emulsifier blends of this invention were tested for their effectiveness in carrying out styrene emulsion polymerizations in water of different hardness. The polymerization technique of Examples I and II was used. The emulsifier blend was the same as in Example II (HLB of 13.5) and this blend was compared to the anionic emulsifier alone and the nonionic emulsifier alone. The following formulation was used:

|   | G. |
|---|---|
| Styrene | 200.0 |
| Water | 300.0 |
| Potassium persulfate | 0.5 |
| Emulsifier | 10.0 |

Table III

| Emulsifier | Water hardness, p.p.m. | Total percent conversion | Conversion rate (percent hr.) | Emulsion stability |
|---|---|---|---|---|
| Anionic | 150 | 21 | 18 | Poor, 15% separation. |
| Nonionic | 150 | 7 | 3.6 | Poor, 5% separation. |
| Blend | (¹) | 79 | 45 | Good. |
| Do | 50 | 89 | 60 | Do. |
| Do | 150 | 72 | 39 | Do. |
| Do | 300 | 66 | 48 | Fair, 2% separation. |
| Do | 1,000 | 75 | 51 | Poor, 10% separation. |

¹ Distilled water.

The results indicate that successful emulsion polymerizations can be carried out in waters of up to about 300 p.p.m. hardness if an anionic/nonionic emulsifier blend is used, whereas poor results were obtained with either the anionic or nonionic alone.

Example IV

The emulsifier blends of this invention were also tested in the emulsion polymerization of vinyl acetate. It is generally regarded as necessary to use protective colloids in the emulsion polymerization of vinyl acetate to prevent agglomeration of the polymer particles as they are formed. Since protective colloids impart haziness, low scrub resistance and water sensitivity to polymer films, it is desirable to keep the concentration of protective colloid as low as possible. In these tests, the protective colloid was completely omitted.

The following formulation was used to carry out the vinyl acetate emulsion polymerization:

| Ingredient: | Amount (grams) |
|---|---|
| Vinyl acetate | 250 |
| Distilled water | 200 |
| Potassium persulfate | 0.15 |
| Emulsifier | 10 |

The apparatus used for the polymerization of vinyl acetate was the same as that used for styrene in Example I, except that the temperature of the bath was adjusted to 70° C. The vinyl acetate was Airco "H" grade, manufactured by Air Reduction Company, which contained 14–17 p.p.m. of hydroquinone as a polymerization inhibitor. The inhibitor was removed by vacuum distillation at 30° C. and 140 mm. pressure. Isopropylamine dodecyl benzene sulfonate and polyoxyethylene (20) oleyl alcohol were used to form the emulsifier blends.

The emulsion polymerization was carried out by dissolving the emulsifier and the persulfate catalyst in the distilled water. While the solution was stirred, the nitrogen was turned on to purge the system of oxygen. An initial addition of 12.5 g. of vinyl acetate was made to the aqueous solution. The mixture was then allowed to heat up to 70° C. with agitation, by which time polymerization had begun. The remaining vinyl acetate was slowly added over a period of about 2.5 hours while stirring the solution. After the addition was completed, the contents were agitated for another half hour at a temperature of about 70° C. The emulsion was then cooled to 35° C. with agitation and filtered.

The results are presented in the following table:

Table IV

| Emulsifier | HLB | Total percent conversion | Emulsion stability | Emulsion viscosity (cps.) | Particle size (microns) |
|---|---|---|---|---|---|
| Anionic/nonionic | 100/0 | 11.7 | 89.0 | Agglomeration within 2 hrs. | | |
| Do | 70/30 | 12.8 | 85.9 | -----do--------------- | | |
| Do | 50/50 | 13.5 | 63.1 | -----do--------------- | | |
| Do | 20/80 | 14.6 | 70.0 | -----do--------------- | | |
| Do | 10/90 | 15.0 | 80.8 | Stable for more than one week. | 44.0 | 0.23 |
| Do | 10/90 | 15.0 | 83.6 | -----do--------------- | 55.0 | 0.24 |
| Do | 10/90 | 15.0 | 85.3 | -----do--------------- | 69.0 | 0.24 |
| Do | 0/100 | 15.3 | 43.9 | Agglomeration within 2 hrs. | | |

The results demonstrate that an anionic/nonionic blend in a 10/90 ratio was a very effective emulsifier for carrying out the emulsion polymerization of vinyl acetate, and that the protective colloid may be omitted and good results obtained when such an emulsifier blend is used.

EXAMPLES V–X

The emulsion polymerization of styrene using isopropylamine dodecyl benzene sulfonate blended with various nonionic emulsifiers was carried out using the formulations and techniques described in Example III. Isopropylamine dodecyl benzene sulfonate was used in every example and was blended with the following nonionic emulsifiers:

Symbol: Emulsifier
A ——————— Polyoxyethylene (15) nonyl phenol.
B ——————— Polyoxyethylene (23) lauryl alcohol.
C ——————— Polyoxyethylene (20) sorbitan monolaurate.
D ——————— Polyoxyethylene (25) polyoxypropylene (1) stearic acid.

The results are presented in Table V:

Table V

| Example | Ratio of anionic/nonionic | HLB | Total conversion, percent | Conversion rate | Emulsion stability | Emulsion viscosity (cps.) | Particle size (microns) | Percent emulsifier |
|---|---|---|---|---|---|---|---|---|
| V | 60/40 A | 13 | 90.6 | 47 | 1 week | 29 | .09 | 1.95 |
| VI | 45/55 A | 13.5 | 91.9 | 43 | ___do___ | 32 | 0.1 | 1.95 |
| VII | 30/70 A | 14 | 91.7 | 56 | 3 days | 30 | 0.1 | 1.95 |
| VIII | 70/30 B | 13.4 | 81.5 | 43 | More than 1 week | 41 | 0.09 | 1.95 |
| IX | 70/30 C | 13.2 | 85.4 | 47 | ___do___ | 42 | 0.08 | 1.95 |
| X | 55/45 D | 13.5 | 94.7 | 60 | ___do___ | 160 | 0.09 | 1.95 |

These results indicate that the various nonionic emulsifiers yielded stable emulsions and good conversion rates.

As used in the claims which follow, the term "consisting essentially of" includes compositions containing the named ingredients and any other ingredients which do not deleteriously affect the compositions for the purposes stated in the specification.

Having completely described this invention, what is claimed is:

1. In an emulsion polymerization process comprising polymerizing a vinyl monomer in an aqueous medium containing a vinyl monomer selected from the group consisting of vinyl acetate and styrene, water and a free radical polymerization catalyst, the improvement which comprises incorporating in the aqueous medium an anionic emulsifier consisting essentially of a lower alkylamine salt of an alkyl aryl sulfonic acid and a nonionic emulsifier consisting essentially of polyoxyethylene compound, said emulsifiers having a combined HLB value ranging from about 7 to about 20 and said anionic emulsifier plus nonionic emulsifier amounting to from about 0.5 to about 5 weight percent of the aqueous medium.

2. The process of claim 1 in which the anionic emulsifier is isopropylamine dodecyl benzene sulfonate.

3. The process of claim 2 in which the nonionic emulsifier is polyoxyethylene oleyl alcohol.

4. In the emulsion polymerization of styrene comprising polymerizing styrene in an aqueous medium containing styrene, water and a free radical polymerization catalyst, the improvement which comprises incorporating in the aqueous medium an anionic emulsifier consisting essentially of a lower alkylamine salt of an alkyl aryl sulfonic acid and a nonionic emulsifier consisting essentially of a polyoxyethylene compound, said emulsifiers having a combined HLB value ranging from about 13.5 to about 16 and said anionic emulsifier plus nonionic emulsifier amounting to from about 0.5 to about 5 weight percent of the aqueous medium.

5. The process of claim 4 in which the water component of the aqueous emulsion contains up to about 300 parts per million hardness.

6. The process of claim 4 in which the anionic emulsifier is isopropylamine dodecyl benzene sulfonate.

7. The process of claim 5 in which the anionic emulsifier is isopropylamine dodecyl benzene sulfonate.

8. In the emulsion polymerization of vinyl acetate comprising polymerizing vinyl acetate in an aqeous medium containing vinyl acetate, water and a free radical polymerization catalyst, the improvement which comprises incorporating in the aqueous medium an anionic emulsifier consisting essentially of a lower alkylamine salt of an alkyl aryl sulfonic acid and a nonionic emulsifier consisting essentially of a polyoxyethylene compound, said emulsifiers, having a combined HLB value ranging from about 14.5 to about 17.5 and said anionic emulsifier plus nonionic emulsifier amounting to from about 0.5 to about 5 weight percent of the aqueous medium.

9. The process of claim 8 in which the anionic emulsifier is isopropyl dodecyl benzene sulfonate.

References Cited by the Examiner

UNITED STATES PATENTS

| | | | |
|---|---|---|---|
| 2,434,054 | 1/1948 | Roedel | 260—89.1 |
| 2,485,141 | 10/1949 | Cornthwaite | 260—89.1 |
| 2,807,590 | 9/1957 | McDonald et al. | 252—353 |
| 2,843,576 | 7/1958 | Dunn | 260—92.8 |
| 2,921,046 | 1/1960 | Arlman | 260—92.8 |
| 2,933,452 | 4/1960 | Byrd | 252—353 |
| 2,934,529 | 4/1960 | Van Dijk | 260—92.8 |
| 3,017,399 | 1/1962 | Holdsworth | 260—92.8 |

OTHER REFERENCES

Schwartz et al.: Surface Active Agents, pages 111–140, Interscience, New York (1949).

JOSEPH L. SCHOFER, *Primary Examiner.*

H. N. BURSTEIN, J. R. LIBERMAN, WILLIAM H. SHORT, *Examiners.*